April 2, 1935.  L. W. THOMPSON  1,996,599
REPULSION RELAY
Filed Feb. 17, 1934

Inventor:
Louis W. Thompson,
by Harry E. Dunham
His Attorney.

Patented Apr. 2, 1935

1,996,599

UNITED STATES PATENT OFFICE 1,996,599

REPULSION RELAY

Louis W. Thompson, Schenectady, N. Y., assignor to General Electric Company, a corporation of New York Application February 17, 1934, Serial No. 711,666

16 Claims. (Cl. 200—91)

My invention relates to electro-responsive devices, more particularly to a repulsion type relay arranged to control the starting circuit of a split-phase induction motor.

It is well understood that in starting motors of the split-phase type it is necessary to provide means for insuring that the starting winding of the motor shall be energized only during the starting period. Much is yet to be desired in providing an inexpensive noiseless relay which will satisfactorily perform the switching operation in response to the current of the motor. It is an object of the present invention to provide a single coil relay which is economical to manufacture, which is noiseless in operation and which controls with great reliability the starting and running connections of the motor.

In carrying out my invention in one form thereof, I provide the armature of a repulsion relay with magnetic holding means so that its operation corresponds to the characteristics of the motor it is arranged to control. More specifically, I provide an E-shaped magnet, the respective poles of which form restricted areas through which a single turn armature conductor is operated by repulsion effect. The single turn conductor carries magnetic members arranged to extend partially across the restricted areas between the center pole and the two outside poles of the frame thereby insuring that the drop-out value of current is less than the pick-up value.

Figure 1:
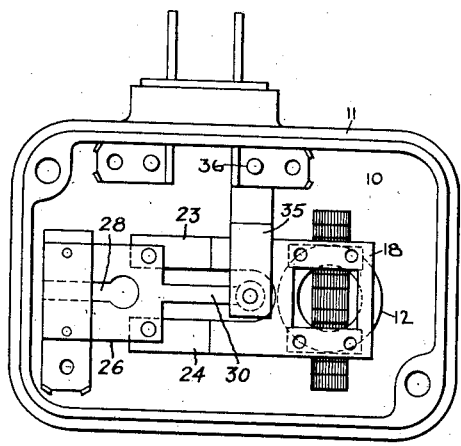
Figure 2:
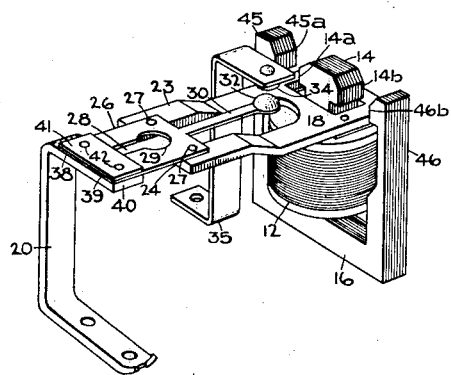
Figure 3:
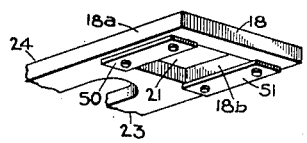
Figure 4:
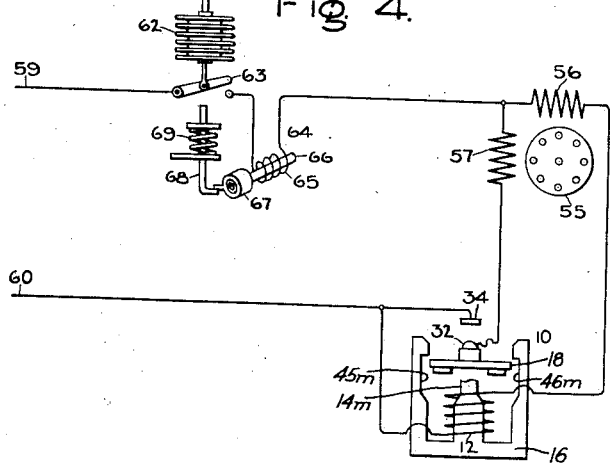

For a more complete understanding of my invention reference should be had to the accompanying drawing wherein I have shown in Fig. 1 a plan view of a relay embodying my invention; Fig. 2 is a perspective view of a portion of the relay of Fig. 1; Fig. 3 is a perspective view of the single turn conductor, whilst Fig. 4 illustrates diagrammatically the application of the relay of Fig. 1 to a motor control system.

Referring to the drawing, I have shown my invention in one form as applied to a relay 10 mounted on a base 11 formed of insulating material. A relay operating coil 12 is mounted on the center pole 14 of a laminated three pole or E-shaped magnet frame 16, while a single turn conductor or armature 18 is supported from the base by means of a U-shaped bracket 20. The single turn armature conductor 18 is preferably formed of a non-magnetic material having high electrical conductivity, such as copper and is provided with an opening 21 which is somewhat larger than the center pole 14 of the magnetic frame the walls of the opening 21 defining the single turn of the armature. In order to simplify the support of the armature 18, the armature is provided with two legs 23 and 24 spaced apart one from the other and to which is secured a flexible spring 26 as by rivets 27. The proper resiliency of the spring 26 is obtained by providing a slot 28 in one end thereof, the slot terminating in a rounded portion 29. Opposite the slot 28 there is provided an extension 30 of the spring to which is secured a movable contact 32 preferably formed of silver. It will be observed that the extension 30 lies between the legs 23 and 24 of the armature 18. Cooperating with the movable contact 32 is a stationary contact 34 secured to a bracket 35 mounted on the base 10 by means of a screw 36. The divided ends 38 and 39 of the spring 26 are secured to one end 40 of the supporting bracket 20 by means of a plate 41 and the rivets 42 thus providing a cantilever spring support for the armature 18. As shown in Figs. 2 and 4, the deenergized position of the armature is substantially below the outer face of the center pole 14 of the E-shaped magnet frame 16. The deenergized position of the armature is adjusted by bending the bracket 20 so as to change the inclination of the cantilever spring 26.

As will be explained more fully hereinafter, upon energization of the winding 12 the armature 18 is operated upwardly by a repulsion force from the position shown in Fig. 2 until the movable contact 32 is firmly forced into engagement with the stationary contact 34. By reason of the resilient mounting of both the armature 18 and the movable contact 32 and the fact that the armature never rigidly engages a stationary member, the relay is substantially noiseless. This feature is a distinct advantage inasmuch as the intended use of the relay is for refrigerating machines, the click incident to the stopping of the armature of relays of the prior type being objected to by the trade. The present relay is extremely quiet in operation due to the absence of any mechanical means of stopping the armature, such, for example, as the sudden mechanical arresting of the motion of the plunger of a solenoid.

In order that the armature conductor 18 of the relay shall move from one position to another in response to a predetermined current flow through the energizing winding 12 and be returned to the deenergized position only when the current decreases substantially below the predetermined value, the laminated frame 16 is designed so that the armature moves from a region of low intensity of magnetic flux to a region of high intensity of magnetic flux. The regions of differing flux intensity are obtained by forming the magnet frame 16 with a varying cross section so that there is a relatively large air gap between the middle portion of each pole and a relatively narrow air gap between the upper ends of the adjacent poles. Thus it will be seen in Figs. 2 and 4 that the middle portion 14m of the center pole 14 is restricted in cross sectional area to form, in conjunction with similar restriction 45m and 46m in the cross sectional areas of the outer poles 45 and 46, relatively large air gaps. These air gaps as they approach the upper ends of the poles 14, 45 and 46 terminate abruptly. Thus the center pole 14 is provided with outwardly extending portions 14a and 14b. Similarly, the outer legs 45 and 46 are provided respectively with inwardly extending portions 45a and 46b so that the air gap between portions 14b and 46b is much less than the air gap between the middle portions 14m and 46m. Similarly, the air gap between the portions 14a and 45a is substantially less than the air gap between the middle portions 14m and 45m. Consequently, the intensity of the magnetic field changes abruptly from the low value in the large air gap to a high value at the outer ends of the poles.

The function of the air gaps will be more fully understood by assuming that the winding 12 is energized so that the magnetic flux linking the armature coil 18 induces sufficient current in the armature coil 18 to move it from its deenergized position in the region of low flux intensity against the bias of the spring 26 to an energized position in the region of high flux intensity. In the deenergized position of low flux intensity, a greater value of current through the coil 12, for example 4 amperes, is required to operate the armature 18, since the current induced in the armature depends on the intensity of the flux linking the coil. Therefore, assuming a constant flow of current, for example 4 amperes through the coil 12, the repulsion force increases as the armature coil 18 moves into the region of higher flux intensity. In actual operation there is a sudden increase in the repulsion force as the coil 18 moves into the narrow air gaps. Therefore, since the repulsion force is increased with the armature in the energized position, the current through the coil 12 can decrease somewhat before the repulsion force is decreased below the force exerted by the cantilever spring 26. This characteristic of a lower drop-out value of current than its pick-up value is particularly desirable for the control of the starting connections of a split-phase induction motor.

In order to increase further the difference between the current required to operate the armature coil 18 from the deenergized position to the energized position and the current required to maintain the armature coil 18 in the energized position, magnetizable plates 50 and 51 are secured respectively to opposite sides 18a and 18b of the armature coil 18. In the deenergized position of the armature coil 18, with the winding 12 energized, a magnetic attractive force is exerted on the plates. The value of this force is relatively small when the armature coil is in its lowermost position but as the armature coil approaches the region of high flux intensity the force rapidly increases, since it varies inversely with the square of the distance from the region of high flux intensity. The force is a maximum when the magnetizable plates are between the extension of the pole pieces.

The addition of the magnetic attractive force to the repulsion force assists in maintaining the armature coil in its energized position. Therefore the effect of the plates is to cause the armature to be maintained in its energized position for lower values of energizing current than if the plates were omitted.

The magnetizable plates 50 and 51 serve an additional important function of imparting a snap action to the armature coil 18. Since the magnetic attractive effort rapidly increases as the plates 50 and 51 approach the region of high flux intensity, the coil 18 is accelerated very rapidly. Consequently by arranging the movable contact 32 so that it is moved into engagement with the stationary contact 34 at the moment the acceleration approaches its maximum value, the equivalent of a snap action is obtained. The same snap action effect is obtained both on the circuit closing operation and the circuit opening operation.

The armature is magnetically stopped by a reduction in the repulsion force when the armature moves beyond the restricted air gaps. Referring to Fig. 2 it will be observed that the extensions 14a, 14b, 45a and 46b are respectively beveled to form above the restricted air gaps a rapidly increasing air gap, the purpose of which is to decrease suddenly the intensity of the field strength above the region of high flux intensity. Consequently as the armature 18 moves beyond the ends of the poles 14, 45 and 46 the repulsion force decreases quickly to a value equal to the opposing force exerted by the spring 26. The repulsion force is further reduced by the plates 50 and 51 which serve to by-pass the flux away from the armature coil 18. Furthermore the concentration of flux through the plates 50 and 51 i. e. magnetic attractive force, also assists in bringing the armature to a standstill and assures that the armature is held with the plates in the region of high flux intensity, any tendency for movement of the plates from the region of high flux intensity being opposed by the reaction of the magnetic flux on the plates.

By varying the width of the air gaps, changing the size of the magnetic plates, and the number of turns on the winding 12 the characteristics of the relay may of course be changed to meet widely varying conditions of operation.

Referring to Fig. 4, I have shown my invention as applied to the control of a split phase alternating current motor 55 of the type commonly used for the driving element of refrigerating machines. The motor 55 is provided with a running winding 56 and a starting winding 57, the running winding 56 being connected in series circuit relation with the relay coil 12. The starting winding 57 is connected to the movable contact 32 of the relay 10, the stationary contact 34 of the relay being connected to an alternating current supply line 60.

The normal duty cycle of the relay 10 in controlling the starting and running connections of the motor 55 is determined in accordance with the temperature within the refrigerator cabinet or with some selected temperature, for example the evaporator temperature. Thus in normal operation an expansible liquid is placed in a container (not shown) and connected to an expansible bellows 62 arranged to open and close a switch 63 connected in circuit with the other alternating current supply line 59.

Circuit controlling switches of this type are well known to those skilled in the art and in general such switches are provided with overload protective devices. The switch 63 is provided with an overload protective device 64 diagrammatically shown as comprising a heater coil 65 connected in circuit with the switch and arranged to heat a rod 66 to which is soldered a gear 67. A plunger 68 is normally maintained out of engagement with the switch 63 against the effort of a compression spring 69 by the gear 67. In case of an overload, however, the solder is melted permitting the gear 67 to turn thereby releasing the plunger 68 which operates the switch 63 to the open circuit position.

In the operation of my invention, it will be assumed that the parts are in the positions shown in the drawing and that the expansible bellows has operated the switch 63 to the closed circuit position. An energizing circuit is thereby completed for the motor 55 and the relay 10 which circuit may be traced from the supply line 59, switch 63, overload coil 65, running winding 56 of the motor, operating coil 12 of the relay 10 and to the other supply line 60. For convenience it will be assumed that the starting current which thereupon flows through the running winding 56 and the relay coil 12 will be of the order of 5 amperes. The relay is designed so that the magnetic flux produced by the coil 12 with this value of current is sufficient to induce a current in the single turn armature coil 18 of the relay to cause the coil or armature 18 to be operated with a snap action to the closed circuit position. An energizing circuit is thereby completed for the starting winding 57, which circuit may be traced from the supply line 59, switch 63, overload coil 65, starting winding 57, movable contact 32 and stationary contact 34 of the relay and to the other supply line 60.

It will be observed that the armature 18 moves from a region of high reluctance or low intensity magnetic field to a region of low reluctance or high intensity magnetic field.

As the speed of the motor increases the motor current decreases. It will be assumed that the current through the running winding 56 will be approximately 4½ amperes when the motor 55 reaches full speed. Consequently the incerase in the repulsion force produced by the increase in the field strength due to the restricted air gaps and the increase in the magnetic attractive force on the magnetizable members 50 and 51 are selected so that the sum of these forces is just insufficient to maintain the relay in its closed circuit position when the assumed value of 4½ amperes flows through the operating coil 12. The armature 18 thereupon operates to deenergize the starting winding 57. The operation of the relay is entirely satisfactory even though the line voltage may vary somewhat from normal line voltage since a predetermined differential of current operates the relay.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An alternating current relay provided with a magnetic frame, a short-circuited armature, an energizing coil associated with said frame and said armature for producing a repulsion force between said armature and coil for operating said armature from one position to a second position, and means effective when said armature reaches a predetermined position for increasing said repulsion force.

2. An alternating current repulsion relay comprising a magnetic frame having poles of varying cross sectional areas arranged to form adjacent air gaps of different sizes, an exciting winding associated with said frame for producing a magnetic flux intensity in said smaller air gap greater than the flux intensity in said larger air gap, a single turn armature coil, means supporting said coil in said larger air gap for movement into said smaller air gap by a repulsion force, said repulsion force varying directly with the intensity of said magnetic flux.

3. An alternating current repulsion relay provided with an operating winding, a stationary magnetic frame operatively associated with said winding, a short-circuited armature formed of non-magnetic material, means for mounting said armature for movement in the magnetic field of said frame from one position to another, said frame being formed to produce in one portion thereof a greater flux intensity than in other portions, and magnetic means associated with said armature for biasing said armature to a position in said field where said flux intensity is greatest.

4. An alternating current relay provided with an operating winding, a stationary magnetic frame provided with an air gap operatively associated with said winding, said frame providing a greater flux intensity across one portion of said air gap than in other portions thereof, a short-circuited armature formed of non-magnetic material, means mounting said armature for movement to and from a position in said higher intensity field, and magnetic means associated with said armature for producing a force on said armature when it occupies said position in said high intensity field substantially greater than when said coil occupies a portion in said low intensity field whereby said armature is maintained in said high intensity field until the current through said operating winding is reduced below the value required for the initial operation of said armature.

5. An alternating current repulsion relay comprising a magentic frame formed with an air gap of varying size, an exciting winding associated with said frame for producing a flux across said air gap, a single turn armature coil mounted in said air gap for operation by repulsion from the wider portion of said air gap to the narrower portion and a magnetic member operable with said armature, said member substantially closing said air gap when said armature is in said narrow portion of said air gap.

6. In an electro-responsive device, an E-shaped magnet formed with restricted air gaps between the outer ends of the poles and a relatively large air gap between the middle portions of said poles, a non-magnetic movable member having an opening the walls of which opening form a single turn coil, means mounting said coil around the middle pole of said magnet for movement from said large air gap to said restricted air gap, magnetic members operable with said movable member for providing low reluctance paths between said poles when said coil is in said restricted air gap, and means energized by the flow of current in said winding for inductively operating said movable member from said large air gap to said restricted air gap.

7. An alternating current relay provided with an operating winding, a stationary magnetic frame operatively associated with said winding, a short-circuited armature formed of a single piece of non-magnetic material, said armature being provided with spaced apart end portions, a resilient member secured to said end portions and having an extension located between said end portions, a movable contact secured to said extension of said resilient member, a stationary contact normally mounted in spaced relation with said movable contact, said armature being operable by repulsion force to move said movable contact into engagement with said stationary contact, and magnetic means associated with said armature and said frame for producing a force on said armature in the same direction as said repulsion force.

8. An alternating current relay, comprising an E-shaped magnet formed with restricted air gaps between the outer ends of the poles thereof and relatively wide air gaps between the middle portions of said poles, an operating winding operatively associated with said magnet, a non-magnetic movable member having a single turn coil, said coil being arranged to encircle the center pole of said E-shaped magnet and having two end portions extending from one side thereof, a resilient member secured to said end portions for supporting said coil for movement between said wide air gaps and said restricted air gaps, said resilient member being provided with a contact supporting extension located intermediate said end portions, a cooperating stationary contact supported in spaced relation with said contact supporting extension, magnetizable members operable with said movable member for exerting a magnetic attractive force on said movable member whereby upon energization of said winding said member is operated by repulsion force and said magnetic attractive force said magnetic force increasing rapidly as said member moves from said wide air gaps into restricted air gaps.

9. An alternating current relay provided with an operating winding, a stationary magnetic frame operatively associated with said winding and provided with adjoining wide and narrow air gaps, a short-circuited armature formed of nonmagnetic material, means mounting said armature for movement from said wide air gaps to said narrow air gaps by repulsion, and magnetic means associated with said armature and said frame for producing a magnetic attractive force on said armature which increases substantially inversely with the distance from said narrow air gaps, said magnetic means also resisting movement of said armature beyond said narrow air gaps.

10. An alternating current relay provided with a stationary magnetic frame provided with air gaps of differing width, an operating winding associated with said air gap for producing a magnetic flux across said air gap of varying intensity, a short-circuited armature formed of non-magnetic material, resilient means mounting said armature for movement in the magnetic field of said frame and normally biasing said armature in a position where said magnetic flux has a minimum intensity, the repulsion force produced by said short-circuited armature and said magnetic flux operating against the bias of said resilient means said armature from said predetermined position toward a position where said magnetic flux has a maximum intensity, and magnetizable members operable with said armature for producing a magnetic attractive force on said armature in the same direction as said repulsion force, said magnetic force increasing in magnitude as said armature moves into the magnetic flux of higher intensity, said magnetizable members automatically causing a substantial reduction in said repulsion force when said armature is moved beyond the narrowest portion of said air gap.

11. An alternating current repulsion relay comprising, an E-shaped magnetic frame formed with wide air gaps between the middle portions of its poles and relatively narrow air gaps between the outer ends of said poles, a winding associated with said frame for producing a magnetic flux having an intensity varying with the width of said air gaps, an armature provided with an opening arranged to receive the middle poles of said frame, the walls of said opening forming a single turn armature coil, said armature having two supporting legs extending in a lateral direction from said coil, a spring secured to said legs for supporting said armature coil for movement about said middle poles and normally biasing said coil to a position in said wide air gaps, said armature coil being operable by repulsion to a position in said narrow air gaps, and magnetizable members secured to opposite sides of said armature coil for producing on said armature a force tending to move said armature toward said narrow air gaps, said force being inversely proportional to the square of the distance of said members from said narrow air gaps, whereby said armature is rapidly accelerated as said magnetizable members approach said narrow air gaps, and circuit controlling means operable by said armature.

12. An alternating current repulsion relay comprising a laminated magnetic frame closed at one end and open at the opposite end, a short-circuited armature coil, a cantilever spring secured to said armature for supporting and biasing said coil to a position below the open end of said frame, an operating winding encircling a portion of said frame for causing a magnetic repulsion force to be produced on said armature coil in a direction to operate said coil against its bias towards said open end of said frame, said cantilever spring being provided with an extension operable with said armature, a circuit-controlling contact mounted on said extension, a cooperating contact mounted in spaced relation therewith, said cantilever spring extension serving as the sole operating means for said circuit-controlling contact.

13. An alternating current repulsion relay provided with a short-circuited armature, a magnet frame, an energizing coil associated with said frame for producing a magnetic flux linking said armature whereby a repulsion force is applied to said armature, means supporting said armature for movement from one position to a second position by said repulsion force, means for biasing said armature to said one position, said frame being formed so as to reduce substantially said repulsion force upon operation of said armature beyond said second position to a value equal to the force of said biasing means.

14. An alternating current relay comprising a laminated magnetic frame closed at one end and open at the opposite end, a non-magnetic electrically conductive short-circuited armature coil having a pair of legs spaced apart one from the other, a bracket, a cantilever spring provided with a slot and a contact supporting extension, means securing one end of said spring to said bracket and the other end of said spring to the respective ends of said legs, said extension being located between said legs, an operating winding encircling a portion of said frame for operating said armature and said contact supporting portions from a given position to a second position and a cooperating contact mounted in spaced relation with said extension for engagement by said contact supporting extension when said armature is operated from one to the other of its positions.

15. An alternating current relay comprising a laminated magnetic frame closed at one end and open at the opposite end, a short-circuited armature coil, a magnetizable member supported on said armature, a bracket, a cantilever spring secured at one end to said bracket and at its other end to said armature for biasing said armature coil to a given position in spaced relation to said open end of said frame, said cantilever spring being provided with a relatively narrow contact supporting extension, an operating winding encircling a portion of said frame for operating said armature from said given position to a second position, and a stationary contact mounted in spaced relation with said extension and resiliently engaged by said extension when said armature is operated from one to the other of its positions.

16. An alternating current relay comprising a laminated magnetic frame closed at one end and open at the opposite end, a non-magnetic electrically conductive short-circuited armature coil, a cantilever spring secured to said armature for biasing said coil to a given position in spaced relation with said open end of said frame, an operating winding encircling a portion of said frame for causing a magnetic attractive force and a magnetic repulsion force on said armature coil to operate said coil from said given position to a second position, a movable contact, resilient supporting means for said movable contact secured to said armature and operable with said armature, and a cooperating contact mounted in spaced relation with said first contact, said cantilever spring forming the sole support for said armature.

LOUIS W. THOMPSON.